(12) United States Patent
Grobman et al.

(10) Patent No.: US 7,788,713 B2
(45) Date of Patent: Aug. 31, 2010

(54) METHOD, APPARATUS AND SYSTEM FOR VIRTUALIZED PEER-TO-PEER PROXY SERVICES

(75) Inventors: Steven Grobman, El Dorado Hills, CA (US); Carl C. Jones, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 1559 days.

(21) Appl. No.: 10/875,833

(22) Filed: Jun. 23, 2004

(65) Prior Publication Data

US 2005/0289648 A1    Dec. 29, 2005

(51) Int. Cl.
*G06F 9/455* (2006.01)
*G06F 9/00* (2006.01)
(52) U.S. Cl. .............. 726/12; 718/1; 726/2; 726/11; 726/26; 726/27; 726/30
(58) Field of Classification Search ............ None
See application file for complete search history.

(56) References Cited

U.S. PATENT DOCUMENTS

| | | | | |
|---|---|---|---|---|
| 6,922,774 | B2* | 7/2005 | Meushaw et al. | 713/151 |
| 7,047,406 | B2* | 5/2006 | Schleicher et al. | 713/168 |
| 7,136,840 | B2* | 11/2006 | Pinkas et al. | 705/75 |
| 2002/0078087 | A1* | 6/2002 | Stone | 707/511 |
| 2005/0027871 | A1* | 2/2005 | Bradley et al. | 709/227 |
| 2005/0132367 | A1* | 6/2005 | Tewari et al. | 718/1 |
| 2005/0138176 | A1* | 6/2005 | Singh et al. | 709/226 |

OTHER PUBLICATIONS

Hamilton et al. "Cache Digest specification—version 5" Dec. 1998. Dowloaded from http://www.squid-cache.org/CacheDigest/cache-digest-v5.txt.*
Wessels et al. "Application of Internet Cache Protocol (ICP), version 2" Sep. 1997. Downloaded from http://www.iett.org/rfc/rfc2187.txt.*

* cited by examiner

*Primary Examiner*—Jung Kim
(74) *Attorney, Agent, or Firm*—Sharmini N. Green

(57) ABSTRACT

A method, apparatus and system for virtualized proxy services are disclosed herein. Specifically, on one embodiment, a virtual proxy may be implemented in a virtual machine host. The virtual proxy may reside within a dedicated or shared virtual partition and may include a set of access restrictions. In one embodiment, a network including virtual machine hosts having virtual proxies may also provide additional peer-to-peer services. More specifically, a virtual proxy on a virtual host may be configured to broadcast/multicast content requests to other virtual hosts on the network prior to accessing the content from a remote location. If the content has previously been downloaded by another virtual host on the network, the virtual proxy on the requesting host may copy the content from the peer virtual host, instead of downloading the content from the remote location again. A variety of security measures may be implemented in one embodiment to ensure data integrity.

16 Claims, 5 Drawing Sheets

METHOD, APPARATUS AND SYSTEM FOR VIRTUALIZED PEER-TO-PEER PROXY SERVICES

BACKGROUND

Corporations typically maintain a separation between their internal network infrastructure and external networks (e.g., the Internet) via a firewall and/or corporate demilitarized zone(s) ("DMZs"). The firewalls and/or DMZ are generally managed by a corporate information technology ("IT") entity and may be utilized to restrict access to selected content on the external network. Thus, for example, while a device resides within the corporate intranet, its access to external internet content may be routed via one or more corporate proxy servers that enforce a variety of rules, i.e., blocks and/or restrictions, to maintain a uniform corporate content access policy. These rules may, for example, block devices on the corporate intranet from accessing content on pornographic websites, gaming websites and/or other websites that the corporation may deem unnecessary and/or undesirable for business purposes.

As telecommuting and/or the use of mobile devices becomes increasingly popular, more and more corporate employees are working from remote locations. When working from these remote locations, however, the computing device is no longer subject to the restrictions of the corporate IT department. Thus, for example, if a user is working from home and is connected directly to the Internet, the user may access and/or download any desired content. To ensure that users conform to the corporate policies, at most the corporate IT department may require the user to log in to the corporate network, thus availing the services of the corporate proxy servers to restrict access. This may prove especially cumbersome for remote users and may be difficult, if not impossible, for the corporate IT department to monitor and enforce. Thus, more often than not, remote users may attach to an external network without going through the corporate intranet, thus avoiding the restrictions enforced by the corporate proxy server.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for virtualized peer-to-peer proxy services. Any reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

An embodiment of the present invention leverages virtualization technology to enable corporate IT departments to offer and/or enforce the same restrictions on devices when they are connected to the corporate intranet as when they are not connected to the intranet. Virtualization technology enables multiple virtual operating environments within a single computing device, each seemingly in complete control of the resources of the device. Applications running within the respective virtual machines typically have no knowledge of the other virtual machines running on the host. A virtual machine manager or virtual machine monitor (hereafter "VMM") may monitor and/or allocate the host's resources to each virtual machine on the host. VMMs are designed to ensure virtual machines (hereafter "VMs") operate in complete isolation, as if they were separate physical devices. VMMs may be implemented in hardware, software, firmware or any combination thereof.

Figure 1:
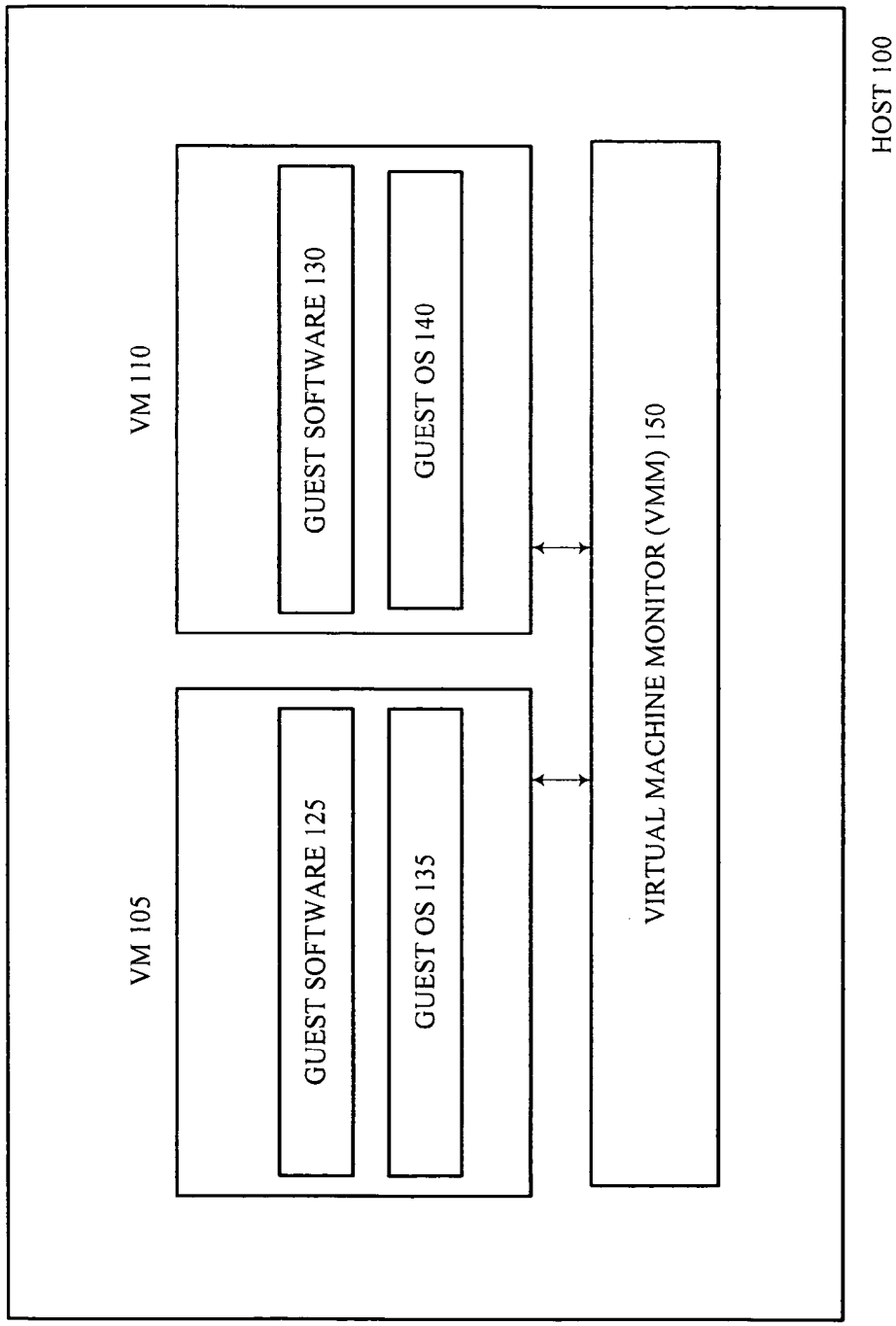
FIG. 1 illustrates a typical virtual host device.

FIG. 1 illustrates an example of a typical virtual machine host device ("Host 100"). As illustrated, VMM 150 typically executes on the device and presents an abstraction(s) of the device platform (i.e., "virtual machines" or "VMs") to other software. Although only two VM partitions are illustrated ("VM 105" and "VM 110", hereafter referred to collectively as "Virtual Machines"), these Virtual Machines are merely illustrative and additional virtual machines may be added to the host. VM 105 and VM 110 may function as self-contained platforms respectively, running their own "guest operating systems" (i.e., operating systems hosted by VMM 150, illustrated as Guest OS 135 and Guest OS 140) and other software (the guest operating system and other software illustrated conceptually as "Guest Software 125" and "Guest Software 130", hereafter referred to collectively as "Guest Software"). Each Guest OS and/or Guest Software operates as if it were running on a dedicated computer rather than a virtual machine. That is, each Guest OS and/or Guest Software may expect to control various events and have access to hardware resources. In reality, VMM 150 has ultimate control over the events and hardware resources and allocates resources to Guest OS and/or Guest Software as necessary. It is known to those of ordinary skill in the art that VMM 150 may be implemented in software, hardware, firmware and/or any combination thereof (e.g., a VMM hosted by an operating system).

According to an embodiment of the present invention, a virtualized proxy may be implemented in a virtual machine on Host 100. Although the following description assumes a corporate enterprise managed by an IT entity for the purposes of illustration, embodiments of the present invention are not so limited. Instead, embodiments of the present invention may be implemented within any virtual machine environment wherein consistent access restrictions are desired (e.g., in a home Local Area Network ("LAN"), to enforce consistent content restrictions on all the home computing devices). According to various embodiments, the virtualized proxy may comprise Guest Software executing within one or more of the VMs of the virtual hosts. The virtualized proxy may leverage VMM 150's framework to enforce restrictive network routing, while leveraging the Guest OS network stack for general network routing capabilities and restriction enforcements. Thus, for example, in one embodiment, user-accessible VMs on Host 100 may be restricted to a "VMM host-only" network, i.e., a network which does not have direct access to the physical network. The VM containing the virtual proxy, however, may have access to both the physical network and the "VMM host-only" network, thus having routing capabilities (i.e., provide general Internet Protocol ("IP") routing for services that it does not proxy and application level proxy services for capabilities that it does proxy).

Figure 2:
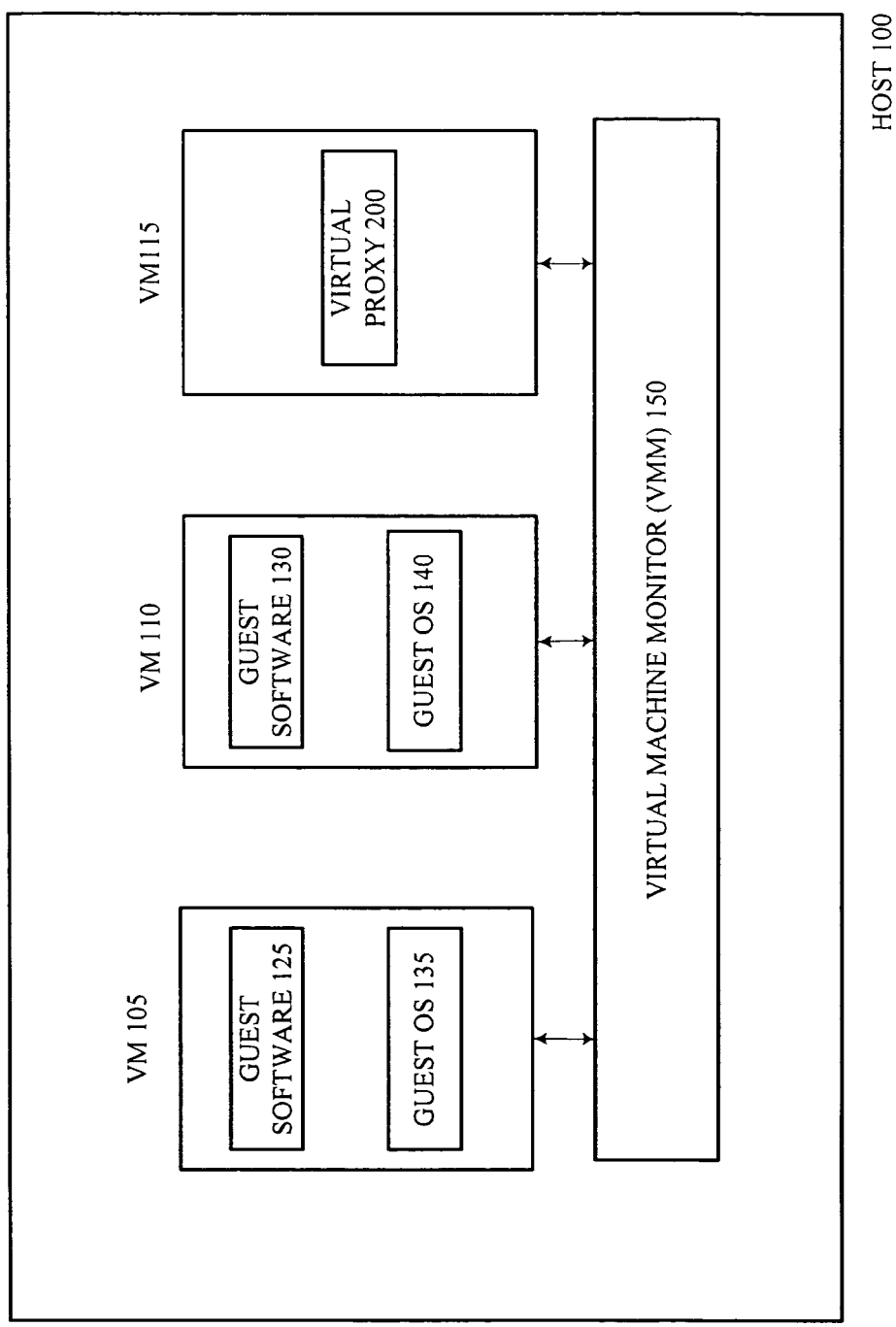
FIG. 2 illustrates conceptually a virtual proxy according to an embodiment of the present invention.

FIG. 2 illustrates an embodiment of the present invention. As illustrated in FIG. 2, in one embodiment, the virtualized proxy ("Virtual Proxy 200") may be embedded in one of the VM partitions (e.g., "VM 115") on Host 100 (typically, but not necessarily, in a separate partition than the partitions accessible by the user). Thus, for example in FIG. 2, if VM 105 is the partition containing all Word documents and VM 110 is the partition that includes all the user's games, Virtual Proxy 200 may be embedded in VM 115, a separate virtual partition that is not accessible by the user and managed by the IT entity of the corporation. Virtual Proxy 200 may thus be configured to implement a consistent corporate content policy, regardless of whether the device is connected to the corporate network. Embodiments of the present invention may be practiced within various VM environments, e.g., including hardware implementations from Intel Corporation, software environments such as VMWare from VMWare Corporation, Virtual PC/Virtual Server from Microsoft Corporation and/or other emerging virtualization environments such as "VServer" (Version 0.28, December 2003), "Denali" (2002, Department of Computer Science and Engineering, The University of Washington") and/or "XEN" (2003, Computer Laboratory, University of Cambridge), which are currently under development.

According to embodiments of the invention, all network traffic originating from the VM partitions on Host 100 may be configured to be routed via Virtual Proxy 200. In an embodiment wherein VMM 150 is a hypervisor, all the VMs on Host 100, including VM 115 (containing Virtual Proxy 200), may be peers. In this embodiment, VMM 150 may map the physical networking capabilities of all the VMs on Host 100 to VM 115 (or more specifically, Virtual Proxy 200), thus ensuring that all network traffic from the VMs are routed via Virtual Proxy 200. Thus, for example, all traffic to port 80 on Host 100 may be "blocked" by rerouting such traffic to Virtual Proxy 200. VM 115 may be a VM dedicated to Virtual Proxy 200 and/or a VM that also runs other applications. For security purposes, however, if VM 115 also runs other applications, the partition is ideally not user-accessible but rather only accessible by the administrative entity (e.g., the corporate IT department). In an alternate embodiment, where VMM 150 is running on a host OS (e.g., VMWare), Virtual Proxy 200 may be implemented in VMM 150 or in one of the VM partitions. In yet another embodiment, Virtual Proxy 200 may be implemented as an application on the host OS.

Figure 3:
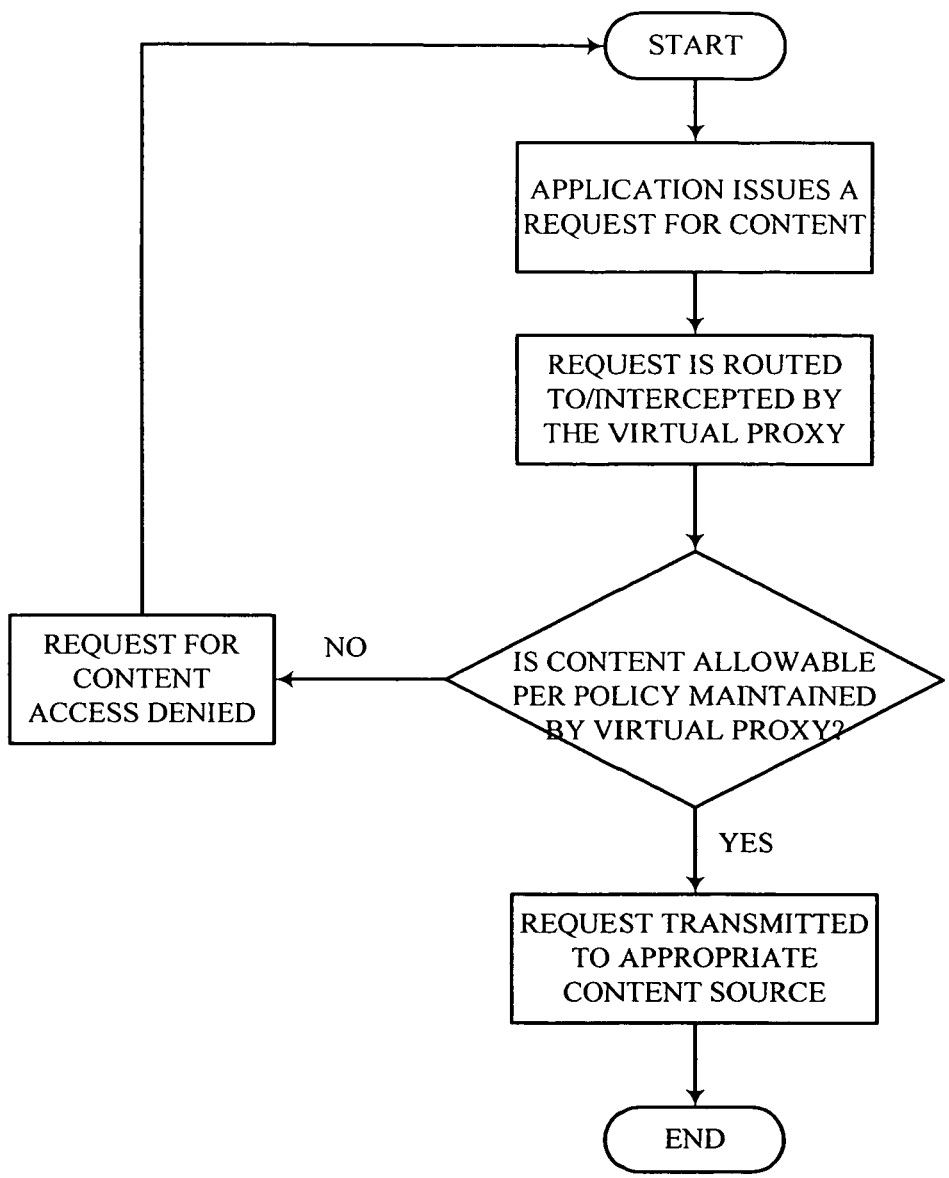
FIG. 3 is a flowchart illustrating an embodiment of the present invention.

FIG. 3 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 301, an application (e.g., a Web browser) running in a virtual machine may issue a request for content. The request may be routed to and/or intercepted by a virtual proxy in 302. In 303, in one embodiment, the virtual proxy may examine its configuration policy to determine whether the requested content is allowable. If the content is allowable, then in 304 the request may be transmitted to the appropriate content source to retrieve the content. If, however, the content is not allowable per the configuration polity, then in 305, the request may be denied. In one embodiment, the user may receive notification that the request has been denied.

In typical enterprise environments, proxy servers may also provide additional services (in conjunction with access restrictions) to facilitate faster and more efficient access of content over the network. Thus, for example, in a typical enterprise network, the proxy server may cache content that it retrieves on behalf of a client on the network. Thereafter, if another client on the network requests the same content, the proxy server may transmit the content to the second client from its cache, instead of having to download the same content again from a remote source. This proxy server caching functionality provides enterprise networks with significant performance benefits because it minimizes costly content downloads.

Figure 4:
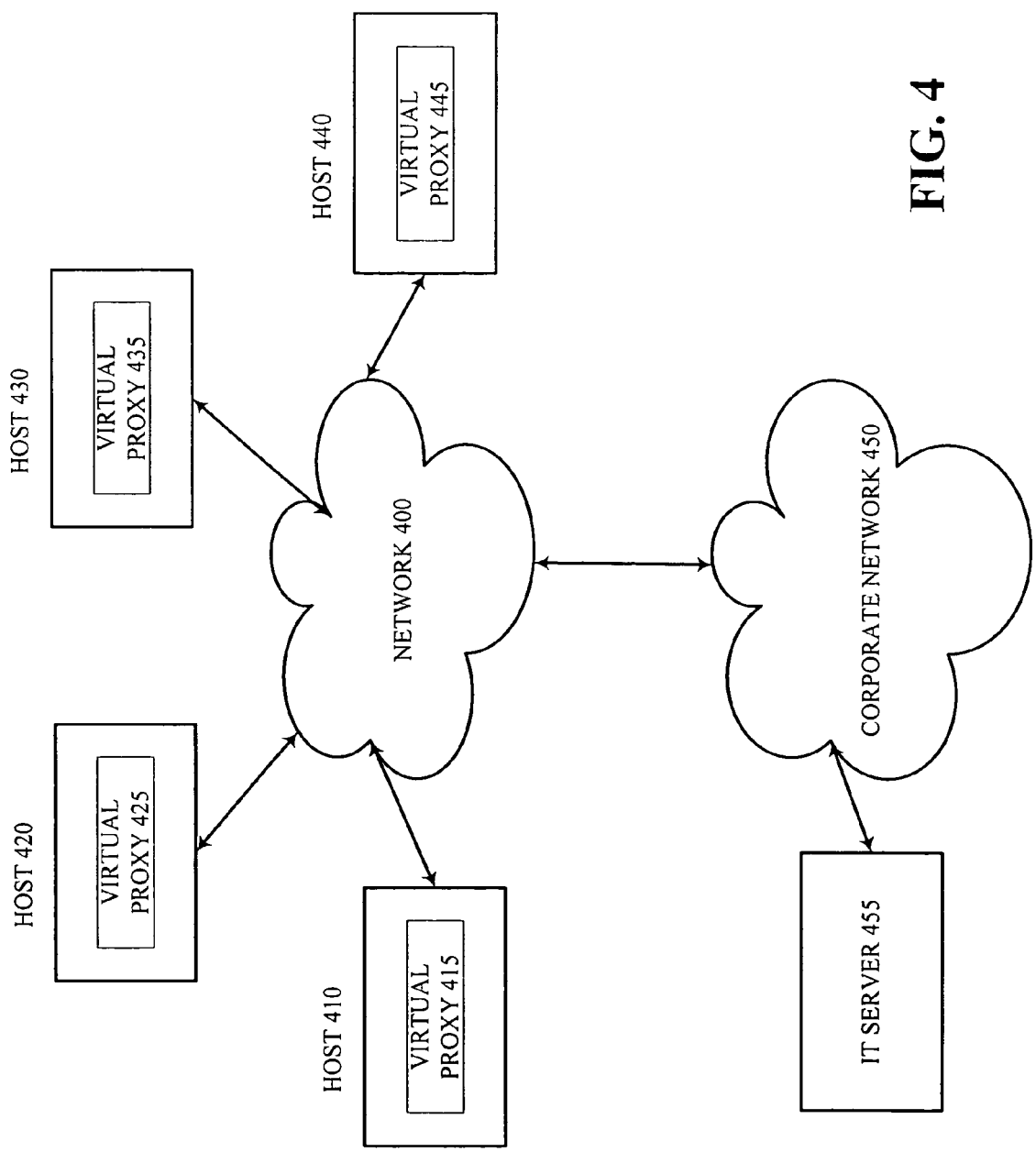
FIG. 4 illustrates the peer-to-peer proxy services according to an embodiment of the present invention.

For small networks such as Local Area Networks ("LANs"), however, an IT entity is unlikely to run a dedicated proxy server akin to those maintained in enterprise networks. In order to achieve similar performance benefits in these LAN environments (and/or other similar environments in which it may not be possible and/or cost effective to run a proxy server), the virtual proxy according to embodiments of the present invention (e.g., Virtual Proxy 200 as described above) may be configured to provide transparent peer-to-peer proxy services. FIG. 4 illustrates an example of a network ("Network 400") in which a virtual host device according to an embodiment of the present invention may execute. As illustrated, the network may include multiple virtual machine devices configured according to an embodiment of the present invention (illustrated as Host 410, Host 420, Host 430 and Host 440, collectively "Hosts"). Each of these devices may include the functionality described above, namely each device may include a virtual proxy (illustrated as Virtual Proxy 415, Virtual Proxy 425, Virtual Proxy 435 and Virtual Proxy 445, collectively "Virtual Proxies"). It will be readily apparent to those of ordinary skill in the art that other details have been omitted herein in order not to unnecessarily obscure embodiments of the present invention. The Hosts may also include, for example, various other VMs, a VMM, etc.

Embodiments of the present invention enable each of the Hosts on the network to securely leverage content downloaded by any other of the Hosts on the network. Thus, for example, if Network 300 is a LAN supporting 100 users in a field sales office of a corporation, one user (e.g., Host 410's user) may download a particular piece of content (e.g., an OS patch) via an Internet connection to the corporate IT department ("Corporate Network 450"), and the content may be stored on Host 410. Thereafter, the Virtual Proxies on Network 400 may be configured to broadcast and/or multicast content requests to all the Hosts on the network ("peers"). Thus, for example, in one embodiment, if Host 420 desires to download the same OS patch previously downloaded by Host 410, Virtual Proxy 425 may broadcast and/or multicast the content request on behalf of Host 420 to all other Hosts on Network 400. If none of the Hosts have previously downloaded the content, then Virtual Proxy 425 may route the content request to the appropriate remote source (i.e., Corporate Network 450"). In the above example, however, since the content was previously downloaded to Host 410, Virtual Proxy 415 may respond to the broadcast/multicast to inform Virtual Proxy 425 that the desired content is available on Host 410. Host 420 may thereafter copy the content from Host 410 instead of downloading the patch from Corporate Network 450. The terms "broadcast" and "multicast" are well known to those of ordinary skill in the art and further description is omitted herein in order not to unnecessarily obscure embodiments of the present invention.

In one embodiment, this "peer-to-peer" proxy caching scheme may achieve significant performance improvements. In order for the Hosts on Network 400 to rely on the peer-to-peer proxy caching services, however, an embodiment of the present invention may include a security scheme. More specifically, to ensure the integrity of the content accessed from peer devices, a content validation scheme may be enforced. In one embodiment, when Host 420 broadcasts/multicasts its content request, the responses from the various other Hosts on Network 400 may include a hash value (e.g., an MD5 hash value) of the content requested. Host 420 may evaluate the responses (if more than one response is received) and select an appropriate location to copy the content from (e.g., Host 410). In various embodiments of the invention, the selection criteria may be as simple as choosing the first Host to respond to the request, or as complex as selecting the Host that is closest (based on network proximity) to Host 410.

Upon selection of Host 410 to copy the content from, in one embodiment, Host 420 may validate the hash value received from Host 410 against an authoritative site. In the example above wherein the content is an OS patch, the authoritative site may, for example, comprise an IT server on Corporate Network 450 ("IT Server 455"), in which the OS patch is stored. Instead of requesting a download of the entire patch, however, Host 420 may simply request the MD5 hash value of the OS patch from IT Server 455. If the MD5 hash value received from IT Server 455 does not match the hash value received from Host 410, Host 420 may deem the content from Host 410 corrupt in some fashion and thereafter select an alternate Host (e.g., Host 430). Host 420 may then repeat the validation process for the MD5 hash value received from Host 430 against IT Server 455.

If, however, the hash value received from IT Server 455 matches the hash value received from Host 410, then Host 420 may proceed to copy the OS patch from Host 410. As an additional measure of security, in one embodiment, Virtual Proxy 425 on Host 420 may itself calculate the MD5 hash value of the content it just copied from Host 410, to ensure that the content remains uncorrupted. The content may thereafter be accessible on the Host 420. If, however, the final MD5 hash value calculated by Virtual Proxy 425 on Host 420 does not match the value validated by the authoritative site (e.g., IT Server 455), Virtual Proxy 425 may discard the content it copied from Host 410 and repeat the process of validating the content on another virtual proxy on a different Host on the network or access the content directly from the original remote source. As will be readily apparent to those of ordinary skill in the art, the process of validating and copying the content from a peer Host on Network 400 provides improved network performance by eliminating an additional download from Network 450.

Figure 5:
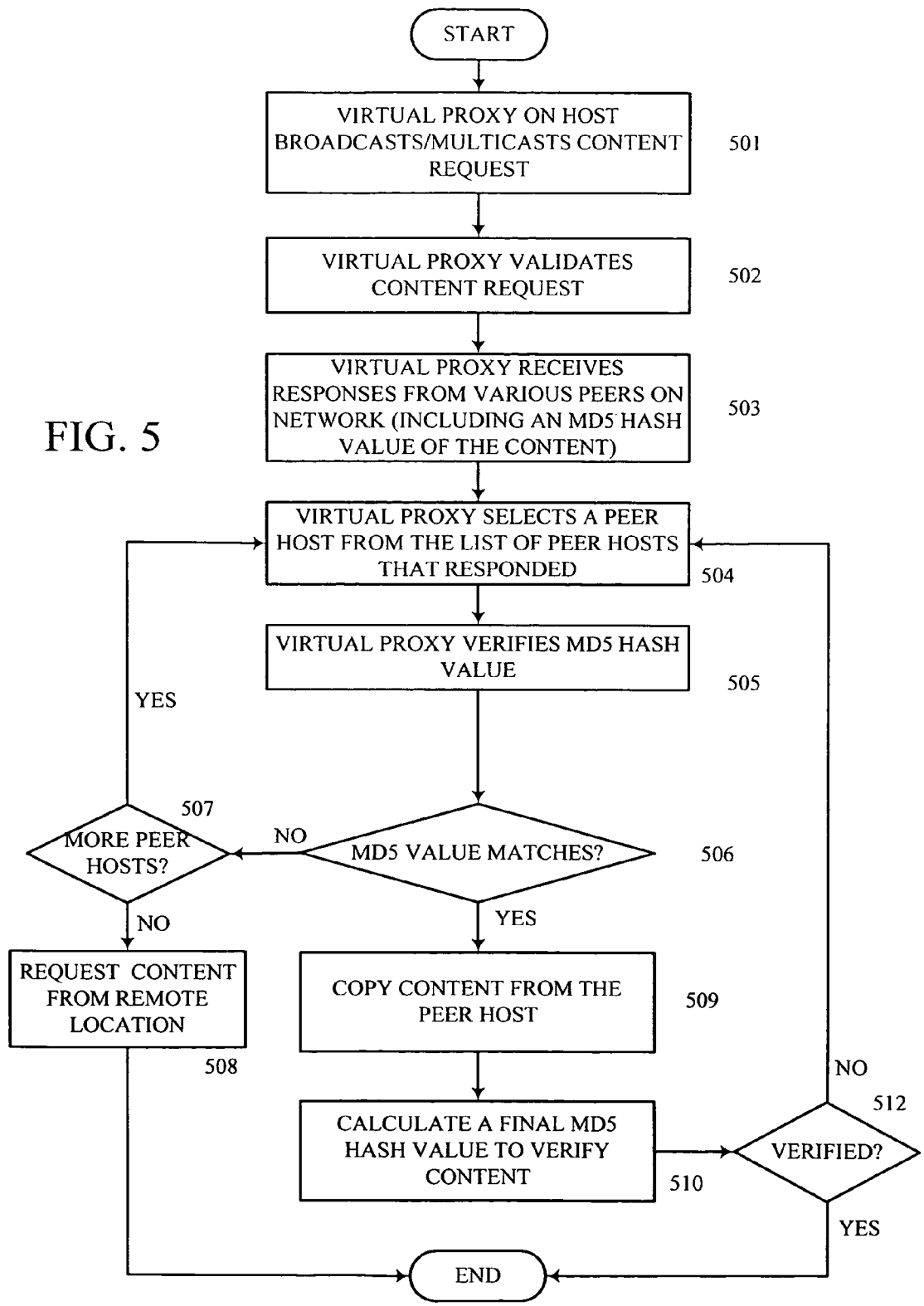
FIG. 5 is a flowchart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, a virtual proxy on a host may broadcast/multicast a content request. In one embodiment, the virtual proxy on the host may validate in 502 that the content is allowed, i.e., not restricted by policy. In 503, the virtual proxy may receive responses from various peer hosts on the network, together with an MD5 hash value of the content on the peer host. Based on one or more predetermined criteria, the virtual proxy may thereafter in 504 select a peer from the list of responses to the broadcast/multicast. In one embodiment, in 505, the virtual proxy may validate the MD5 hash value from the selected peer (e.g., by comparing it against the MD5 hash value of the original content from an authoritative site or by requesting the authoritative site to validate the content). If MD5 value of the original content from the authoritative site does not match the MD5 value of the content from the selected peer in 506, then the virtual proxy may examine whether other peer hosts responded in 507. If other peer hosts responded to the broadcast/multicast, the virtual proxy may select another peer in 504 and repeat the validation process against the authoritative site. If no other peer hosts responded or if the process fails with each peer host that responded, the virtual proxy may ultimately request another download of the content from a remote location in 508. If, however, the MD5 value of the content from the authoritative site matches the MD5 value of the content from the selected peer in 506, then the virtual proxy may copy the content from the selected peer to the host in 509. The virtual proxy may then calculate a final MD5 value of the copied content in 510 to verify the content. If the content is verified in 512, then the content may be available to the host. If, however, the content is not verified (i.e., the hash value is not validated against the authoritative site), then the virtual proxy may repeat the process in 504 (or in an alternate embodiment, access the content from the remote content site).

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices).

According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such current and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method for executing a virtual proxy, comprising:
   starting up a virtual proxy in a first virtual machine ("VM") on a VM host, the virtual proxy for enforcing access restrictions by:
      intercepting a content request from a second VM on the VM host;
      enforcing access restrictions on the content request;
      routing the content request to a content source if the content request clears the access restrictions;
      denying the content request if the content request fails to clear the access restrictions;
      caching content received in response to the content request;
      receiving a second content request wherein the cached content is responsive to the second content request; and
      responding to the second content request by providing a hash value of the cached content.

2. A computer-implemented method for executing a virtual proxy, comprising:
   starting up a virtual proxy in a first virtual machine ("VM") on a first VM host coupled to a network, the virtual proxy for enforcing access restrictions by:
      intercepting a content request from a second VM on the first VM host;
      enforcing access restrictions on the content request;
      transmitting the content request via a broadcast protocol to other VM hosts coupled to the network if the content request clears the access restrictions; and
      receiving a response from at least one of the other VM hosts coupled to the network if the at least one of the other VM hosts contains content corresponding to the content request.

3. The computer-implemented method according to claim 2 wherein the virtual proxy is further for:
   examining the response from the at least one of the other VM hosts;
   validating the content on the at least one of the other VM hosts using the response; and
   determining based on the validation whether to copy the content from the at least one other VM host to the first VM host.

4. The computer-implemented method according to claim 3 wherein the response from the at least one other VM hosts comprises a hash value of the content.

5. The computer-implemented method according to claim 4 wherein validating the content further comprises one of:
   comparing the hash value of the content from the at least one of the other VM hosts to a hash value requested from an authoritative site and requesting the authoritative site to validate the content by providing the authoritative entity with the hash value of the content from the at least one of the other VM hosts.

6. The computer-implemented method according to claim 5 wherein the virtual proxy is further for copying the content from the at least one other of the VM hosts to the first VM host if the content passes validation and selecting a second of the other VM hosts that responded if the content fails validation.

7. The computer-implemented method according to claim 6 wherein the virtual proxy is further for calculating a final hash value to validate the content if the content is copied from the at least one other of the VM hosts.

8. The computer-implemented method according to claim 7 wherein if the final hash value does not validate the content, the virtual proxy is for:
   discarding the content; and
   selecting one of:
      a third of the other VM hosts that responded, and
      a remote site containing the content.

9. A machine-accessible device having stored thereon instructions that, when executed by a machine, cause the machine to:
   start up a virtual proxy in a first virtual machine ("VM") on a VM host, the virtual proxy for enforcing access restrictions by:
      intercepting a content request from a second VM on the VM host; enforcing access restrictions on the content request;
      routing the content request to a content source if the content request clears the access restrictions;
      denying the content request if the content request fails to clear the access restrictions;
      caching content received in response to the content request;
      receiving a second content request for the cached content; and
      responding to the second content request by providing a hash value of the cached content.

10. A machine-accessible device having stored thereon instructions that, when executed by a machine, cause the machine to:
    start up a virtual proxy in a first virtual machine ("VM") on a first VM host coupled to a network, the virtual proxy for enforcing access restrictions by:
       intercepting a content request from a second VM on the first VM host;
       enforcing access restrictions on the content request;
       transmitting the content request via a broadcast protocol to other VM hosts coupled to the network if the content request clears the access restrictions; and
       receiving a response from at least one of the other VM hosts coupled to the network if the at least one of the other VM hosts contains content corresponding to the content request.

11. The machine-accessible device according to claim 10 wherein the instructions, when executed by the machine, further cause the machine to:
    examine the response from the at least one of the other VM hosts;
    validate the content on the at least one of the other VM hosts using the response; and
    determine based on the validation whether to copy the content from the at least one of the other VM hosts to the first VM host.

12. The machine-accessible device according to claim 11 wherein the response from the at least one of the other VM hosts comprises a hash value of the content.

13. The machine-accessible device according to claim 12 wherein the instructions, when executed by the machine, further cause the machine to validate the content by one of: comparing the hash value of the content from the at least one of the other VM hosts to a hash value requested from an authoritative entity and requesting the authoritative entity to validate the content.

14. The machine-accessible device according to claim 13 wherein the instructions, when executed by the machine, further cause the machine to copy the content from the at least one other VM host to the first VM host if the hash value of the content from the at least one other VM host matches the hash value requested from the authoritative entity.

15. The machine-accessible device according to claim 14 wherein the instructions, when executed by the machine, further cause the machine to calculate a final hash value corresponding to the content copied from the at least one other VM host to validate the content.

16. The machine-accessible device according to claim 15 wherein the instructions, when executed by the machine, further cause the machine to discard the content and select one of: a third of the other VM hosts that responded, and a remote site containing the content, if the final hash value does not validate the content.

* * * * *